United States Patent [19]

Harada et al.

[11] 3,963,522

[45] June 15, 1976

[54] METHOD OF IMPROVED TREATMENT RELATING TO THE SURFACE OF THE ELECTROLYTE FOR A SOLID ELECTROLYTE CELL

[75] Inventors: Toyoo Harada; Shigenori Funayama, both of Sendai, Japan

[73] Assignee: Kabushiki Kaisha Daini Seikosha, Japan

[22] Filed: Nov. 13, 1974

[21] Appl. No.: 523,522

[30] Foreign Application Priority Data

Nov. 16, 1973 Japan.............................. 48-129015

[52] U.S. Cl. ............................................... 136/153
[51] Int. Cl.² .......................................... H01M 6/18
[58] Field of Search ................. 136/86 R, 153, 86 D

[56] References Cited
UNITED STATES PATENTS 3,257,239  6/1966  Shultz et al. ...................... 136/86 R
3,475,223  10/1969  Kummer .......................... 136/86 R
3,485,676  12/1969  Hodgson .......................... 136/86 R
3,492,165  1/1970  Guillot et al. ................... 136/86 R

*Primary Examiner*—T. Tung
*Assistant Examiner*—H. A. Feeley
*Attorney, Agent, or Firm*—Robert E. Burns; Emmanuel J. Lobato; Bruce L. Adams

[57] ABSTRACT

The method of improved treatment relating to the surface of the electrolyte for a solid electrolyte cell of $Na^+$ ion conduction type is disclosed. Conductive paint containing unoxidized metal powder such as silver, gold or mixtures thereof is coated on the surface of said solid electrolyte and sintered in the range 700°–900°C so that faradaic impedance at the electrode-electrolyte interface is lowered. After sintering, the solid electrolyte is treated with fused sodium nitrate salt to prevent characteristic changes during extended storage.

3 Claims, 4 Drawing Figures

METHOD OF IMPROVED TREATMENT RELATING TO THE SURFACE OF THE ELECTROLYTE FOR A SOLID ELECTROLYTE CELL

FIELD OF THE INVENTION

This invention relates to the method of improved treatment for the surface of the electrolyte of a solid electrolyte cell.

BACKGROUND OF THE INVENTION

Solid electrolyte cells have been used in the electronic industry for apparatus relating to aviation, measurement and control apparatus. Such cells are desirable because they have long shelf life, less leakage of internal solvents, high generating voltage per cell and thus are easy to laminate.

However, a conventional solid electrolyte cell with $\beta$-alumina of $Na^+$ ion conduction type is used only above the temperature of 200°C, because the electric conductivity of the solid electrolyte is low at the room temperature and polarisation is large.

This gives rise to many difficult problems, such as: oxidization of anodic active material; treatment and design for preventing corrosion of cans and the solid electrolyte; and choice of materials for heat-resistant sealing of the cans.

Furthermore, since cathodic active material and anodic active material are used in the molten state, a heating device must be supplied. Because of these problems, the use of such cells is inconvenient and is not necessarily safe.

SUMMARY OF THE INVENTION

An object of this invention is to provide a method of improved treatment relating to the surface of the electrolyte for a solid electrolyte cell.

According to this invention, the faradaic impedance at the electrode-solid electrolyte interface is diminished and characteristic deterioration changes during extended storage time is prevented. According to this invention, a conductive paint, containing non-oxidized metal powder of gold, silver or mixtures thereof is coated on the surface of the solid electrolyte and the so-painted solid electrolyte element is sintered. After sintering, the so-coated electrolyte is cooled and then treated with a fused salt to prevent characteristic storage deterioration.

Thus there is provided a stable solid electrolyte cell having sufficient capacity at room temperature.

The foregoing object and other objects as well as the characteristic features of the invention will become more apparent and more readily understandable by the following description.

DETAILED DESCRIPTION OF THE INVENTION

In one embodiment of this invention, a conductive paint containing non-oxidized metal powder such as gold or silver, separately or both, is suspended in toluene. Then, this paint suspension is uniformly coated on the surface of the solid electrolyte, $\beta$-alumina, and is dried at about 70°–80°C about one hour.

Figure 1:
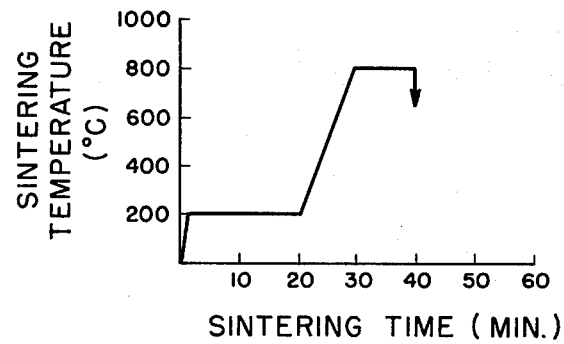
FIG. 1 shows the relationship between sintering time and temperature.

Then the painted solid electrolyte of $\beta$-alumina is sintered in an electric furnace at a temperature of 200°C during 20 minutes in the air or an inert atmosphere and then the sintering oven temperature is raised to 800°C during 10 minutes, and after that it is cooled. The relationship between sintering time and temperature is shown in FIG. 1.

The faradaic impedance at the electrode-electrolyte interface is diminished by the above treatment, however, the storage stability of such electrodes in air is not necessarily sufficient or adequate for commercial use. Because of this stability problem the coated $\beta$-alumina solid electrolyte element must be sealed into a cell within 6 hours after finishing this treatment to serve for practical use.

Figure 2:
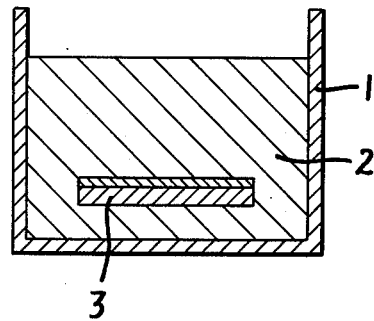
FIG. 2 shows soaking treatment in a fused salt which is carried out after sintering.

However, it is possible to prevent the characteristic instability change of $\beta$-alumina during storage and thus making it convenient for manufacturing procedures by the following treatment, shown in FIG. 2.

Sodium nitrate containing ion-conductive species as cation is put into the vessel 1, and is fused by heating it over its melting point, about 350°C. The said solid electrolyte 3 which has been sintered at about 800°C and then cooled by the above steps is then soaked in said fused sodium nitrate for about a day and a night. After washing in water it is then dried.

Figure 3:
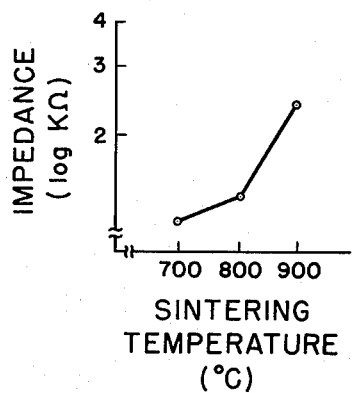
FIG. 3 shows the relationship between sintering temperature and faradaic impedance at the electrode-electrolyte interface.

The effect of the sintering temperature on the impedance of the solid electrolyte after coating with the electro-conductive material on the surface of the solid electrolyte is shown in FIG. 3. It is understood from FIG. 3 that the lower the sintering temperature, the lower will be the value of faradaic impedance at the electrode-electrolyte interface. In this exemplary case, the electro-conductive material of the paint is silver, and said faradaic impedance is measured at a frequency of 10KHZ.

However, if the sintering temperature is too low, below the temperature in FIG. 3, the layer of said electro-conductive material is apt to peel off. The most suitable sintering temperature is determined by considering the aforementioned peeling and impedance conditions. Further, the shorter the time for increasing the sintering temperature, the lower will be the value of the faradaic impedance at the electrode-electrolyte interface.

Figure 4:
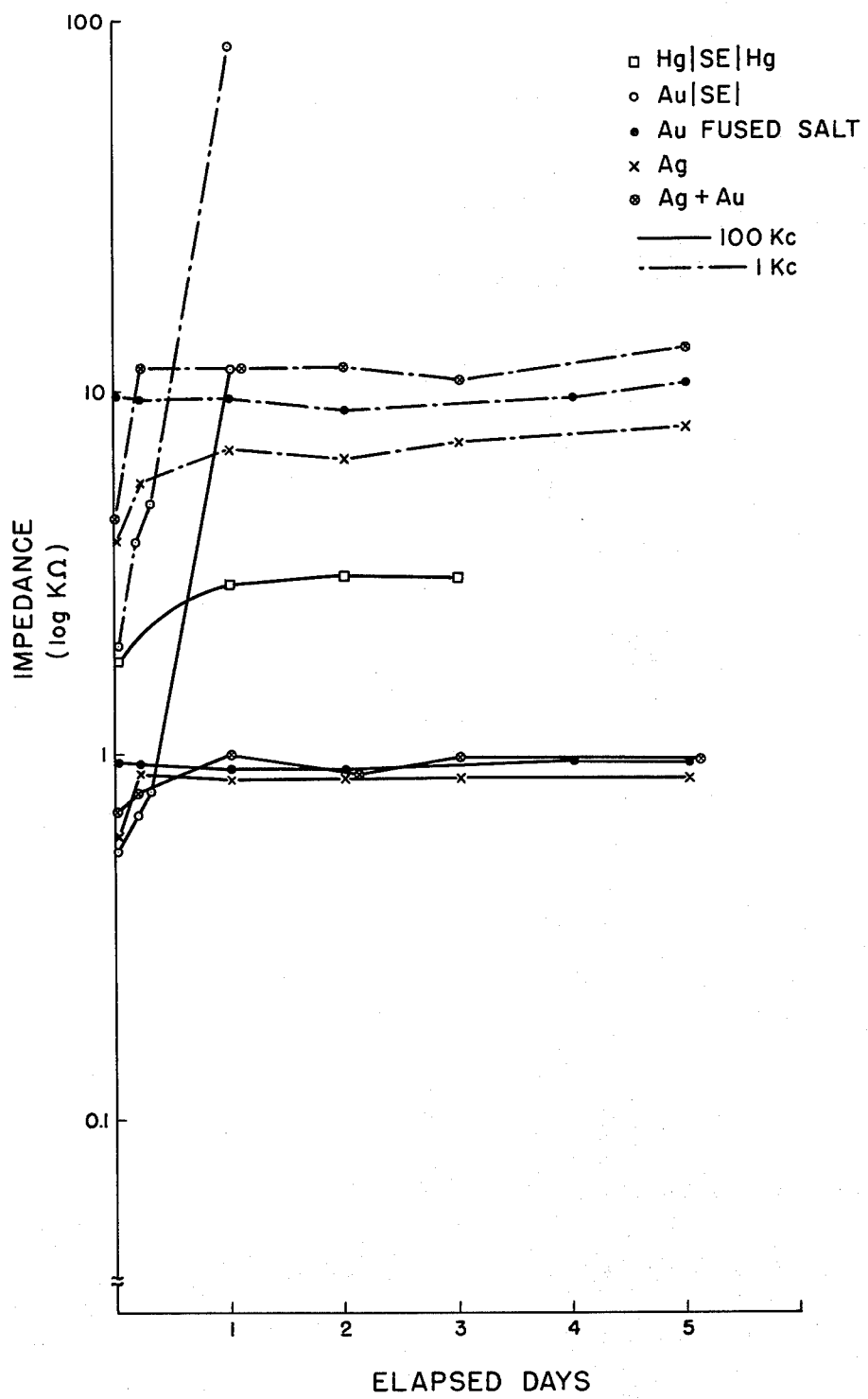
FIG. 4 shows the relationship between improved storage and impedance of $\beta$-aluminas which have been soaked in a sodium nitrate bath and those which have not be so-treated.

FIG. 4 shows the relationship between storage time and impedance of $\beta$-aluminas which have been treated by this invention, and which have not been treated. The measuring frequencies are both 100KHZ (solid line) and 1KHZ (chained line). In this figure, marks ".", "x" and "⊗" respectively show characteristics of solid electrolytes coated by gold, silver and a mixture of gold and silver. On the other hand, marks "□" and "O" respectively show characteristics of cell constructions, Hg/SE/Hg and Au/SE/, with solid electrolytes not treated by the aforementioned treatments with conductive paints. (SE = Solid electrolyte).

It is understood from FIG. 4 that the characteristics of all cells having a solid electrolyte on which conductive paint is sintered, are better than untreated cells in faradaic impedance at the electrode-electrolyte interface and exhibit better stability during storage.

The solid β-alumina electrolytes for this invention are made by a hot pressing technique. One method of preparing suitable β-alumina solid electrolyte elements includes the following steps.

Gamma-alumina or alpha-alumina is mixed with sodium aluminate ($NaAlO_2$) in methanol or other nonaqueous solvent for the aluminate. The ratio of the former and the latter is about 78 weight percent to 22 weight percent. Then this mixture is ground into slurry. The diameter of the solid particles in the slurry is preferably less than three microns at this stage.

Above slurry is dried and is re-ground.

This re-ground material is pre-baked at the temperature of 1200° – 1400°C for about five hours or more.

Then it is pulverized again in the air or in a nonaqueous liquid medium such as methanol and then dried.

This dried material is heated to a temperature of 1200° – 1600°C and maintained at a pressure of 150 – 250 kg/cm² for at least one hour. The pressure is then released and the so-heat treated material is hot pressed under the following conditions:

Temperature: 1700° – 1900°C
Pressure: 200 – 350 kg/cm²
Pressing time: 5 – 120 minutes The hot pressed beta-alumina made by above steps is cut to form solid electrolyte pellets or elements having appropriate sizes.

These elements are further heat treated at a temperature of about 1600°C for at least 2 hours before cooling and assemblying into cells.

The invention can be modified within the range which does not constitute departure from the spirit and scope of the invention as set forth in the appended claims.

What is claimed is:

1. The method of treatment of surfaces of the β-alumina electrolyte for a solid electrolyte cell of $Na^+$ ion conductive type to lower the faradaic impedance at the electrode-electrolyte interface and to prevent deterioration of such electrolytes during storage, wherein the conductive paint, containing unoxidized metal powder selected from the group consisting of powdered gold, silver and mixtures thereof is coated on the surface of said solid electrolyte, sintered at a temperature in the range 700°C to 900°C, cooled and then further coated by immersion in a fused sodium nitrate salt bath.

2. The method according to claim 1 wherein said β-alumina solid electrolyte for powdered metal coating is prepared by hot pressing and heat treating of gamma or alpha aluminas.

3. A solid β-alumina electrolyte element coated at the electrode interface with a layer of sintered unoxidized metal powder selected from the group consisting of silver, gold and mixtures thereof and said coated electrolyte element is further coated with fused sodium nitrate.

* * * * *